United States Patent [19]
LoBianco et al.

[11] Patent Number: 5,214,492
[45] Date of Patent: May 25, 1993

[54] APPARATUS FOR PRODUCING AN ACCURATELY ALIGNED APERTURE OF SELECTABLE DIAMETER

[75] Inventors: Robert T. LoBianco, Mountain View; Thomas E. Clawges; Adam C. Rhoads, both of Pleasanton, all of Calif.

[73] Assignee: Optical Specialties, Inc., Fremont, Calif.

[21] Appl. No.: 739,896

[22] Filed: Aug. 2, 1991

[51] Int. Cl.⁵ .............................................. G01B 11/26
[52] U.S. Cl. .................................................... 356/400
[58] Field of Search ...................... 356/400, 310, 401; 359/889, 559; 362/282, 284

[56] References Cited

U.S. PATENT DOCUMENTS

2,214,728 10/1936 Gille et al. ........................... 359/889
4,761,057 8/1988 Zak et al. ............................. 356/310

Primary Examiner—Samuel A. Turner
Attorney, Agent, or Firm—John A. Frazzini

[57] ABSTRACT

An apparatus having a set of apertures of selected diameters, each aperture being positioned in a multiaperture assembly that can be moved to bring selectively each of these apertures into a path of a beam. This enables control of the diameter of an aperture in a beam and also enables accurate positioning of that aperture so that it is centered on the beam where it is moved to a position of alignment with the beam.

10 Claims, 6 Drawing Sheets

Translation

Runout

Rotation

Expansion

Bow

Orthogonality

APPARATUS FOR PRODUCING AN ACCURATELY ALIGNED APERTURE OF SELECTABLE DIAMETER

In the figures, each element indicated by a reference numeral will be indicated by the same reference numeral in every figure in which that element appears. The first digit of any reference numeral indicates the first figure in which its associated element is presented.

BACKGROUND OF THE INVENTION

This invention relates in general to devices having an aperture of selectable diameter and relates more particularly to such a device in which this aperture is very accurately aligned with a desired optical axis. In one particularly useful application of this apparatus, this apparatus is part of an optical system that is utilized during integrated circuit fabrication to measure accurately the alignment between successive patterned layers of the integrated circuit being fabricated.

Integrated circuits typically consist of several layers of material that are patterned and interconnected in such a manner that these layers produce the desired integrated circuit. There are many different processes for producing patterned layers. However, regardless of the manner of producing each layer, in order to achieve an acceptable yield of good circuits, it is crucial that each layer be accurately aligned to all other layers so that the circuit will operate properly.

In a typical wafer fabrication process, each of these patterned layers is formed by the steps of: (a) depositing on the wafer a layer of resist; (b) exposing this layer with radiation to produce a pattern of exposed regions in this layer; (c) developing the resist to produce a contact mask; and then (d) processing the wafer through this contact mask. In these steps, the resist can, for example, be a photoresist that is exposed by light imaged through a projection reticle or can be a resist that is sensitive to incidence of an electron beam that is controlled to produce the desired pattern of exposure in the resist. In each of these cases, the resist layer is developed to produce the contact mask. The contact mask can be used, for example, during deposition or implant steps to determine where material is added to the wafer and can also be used, for example, during etching steps to determine where material is removed from the wafer.

In most integrated circuit manufacturing processes, a stepper is utilized to produce a two dimensional pattern of identical integrated circuits on a single integrated circuit wafer, thereby greatly increasing the throughput of the integrated circuit manufacturing process. This stepper accurately translates an integrated circuit wafer in each of two perpendicular directions that are parallel to a major planar surface (i.e., the top surface) of this wafer.

Unfortunately, the stepper can produce a number of different types of misalignment between successive layers. Therefore, in general, before each production run for a given layer, a test wafer 10 is produced and a registration tool is utilized to measure the alignment between these successive layers. In each of these two layers are a set of alignment marks. The registration tool checks for alignment between each alignment mark in one layer relative to its associated alignment mark in the other layer. If there is sufficiently accurate alignment between the associated registration marks in these two layers, then a process run is initiated. If there is not sufficient alignment, then the misalignment information is utilized to adjust the stepper. This process is repeated until the required degree of alignment is achieved and then the process run is initiated.

Figure 1A:
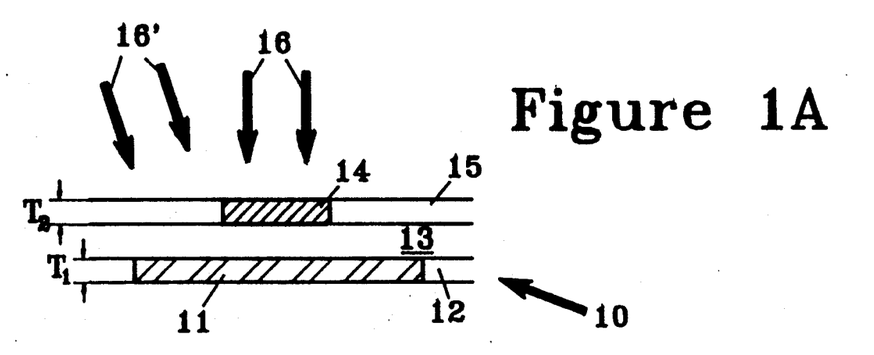
FIGS. 1A and 1B are side and top views, respectively, of alignment marks in a test wafer used to test registration between two successive layers of an integrated circuit being manufactured.
Figure 1B:
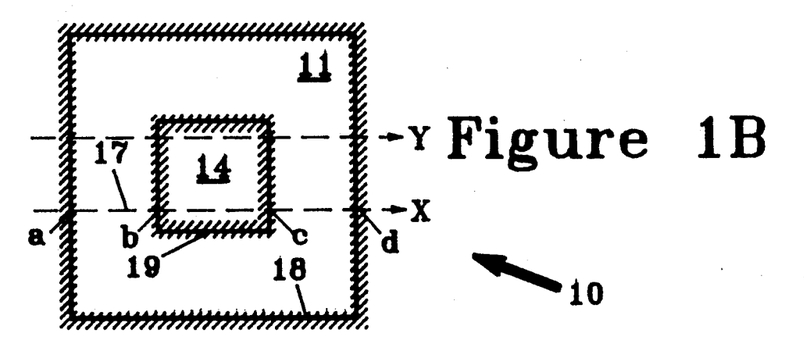

FIGS. 1A, 1B, 1C and 2 illustrate the process of measuring the registration of marks 11 in a first layer 12 with marks 14 in a second layer 15. FIGS. 1A and 1B are side and top views, respectively, of a pair of rectangular marks 11 and 14 that are supposed to be aligned laterally such that mark 14 is centered vertically over mark 11 to produce a box-in-a-box pattern as illustrated in FIG. 1B. For example, if bottom layer 12 is a layer of metallization covered by a layer 13 of polysilicon that is to be patterned, layer 15 is photoresist that has been exposed to produce an opaque region 14.

Figure 1C:
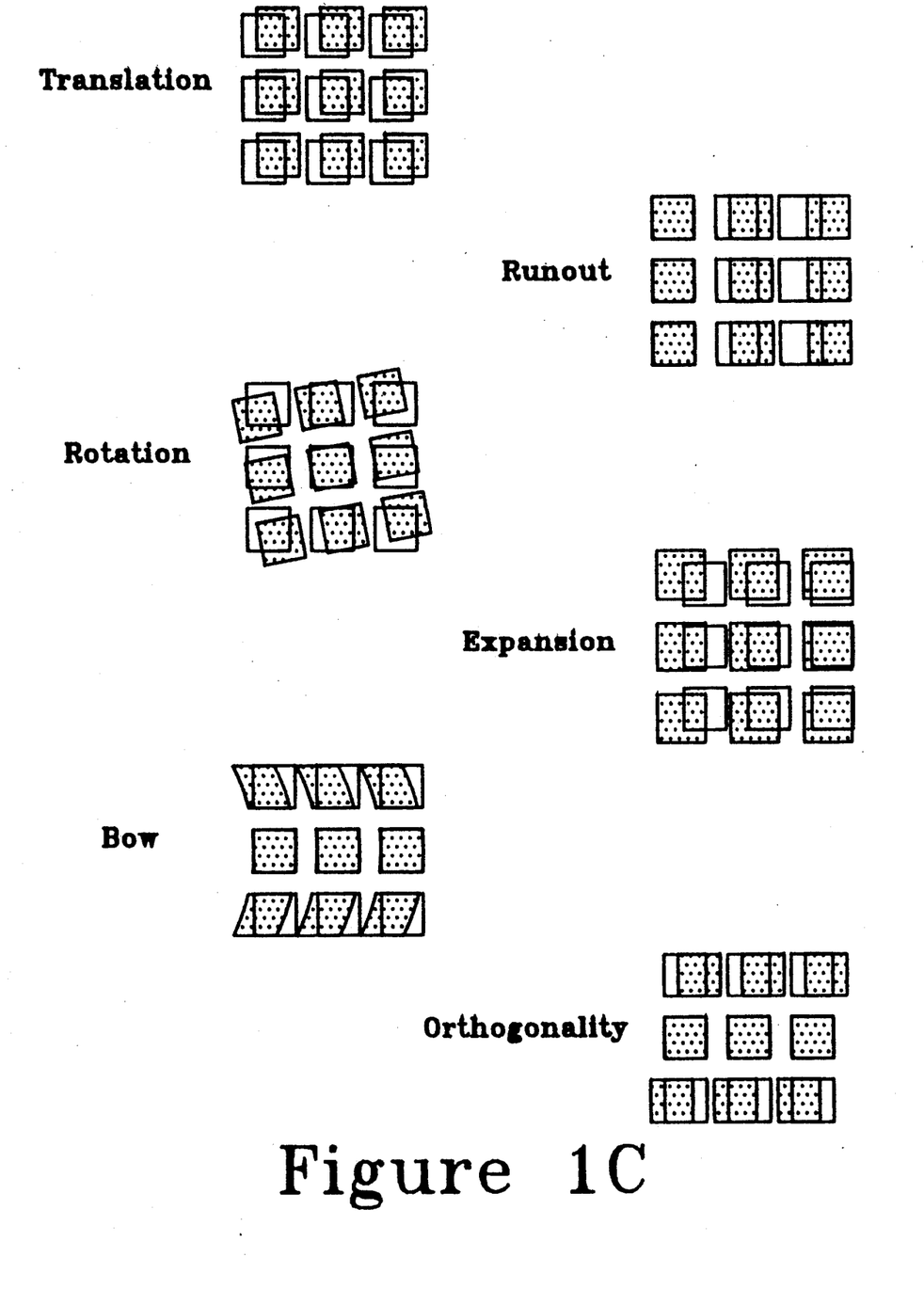
FIG. 1C illustrates several types of systematic pattern generation errors that can be produced by a pattern generator.

For the case of a rectangular array of nine square alignment marks, FIG. 1C illustrates seven different types of alignment and projection errors: translation, rotation, expansion, orthogonality, bow, runout and residual (i.e., those remaining alignment errors that remain after the prior six have been eliminated).

Figure 2:
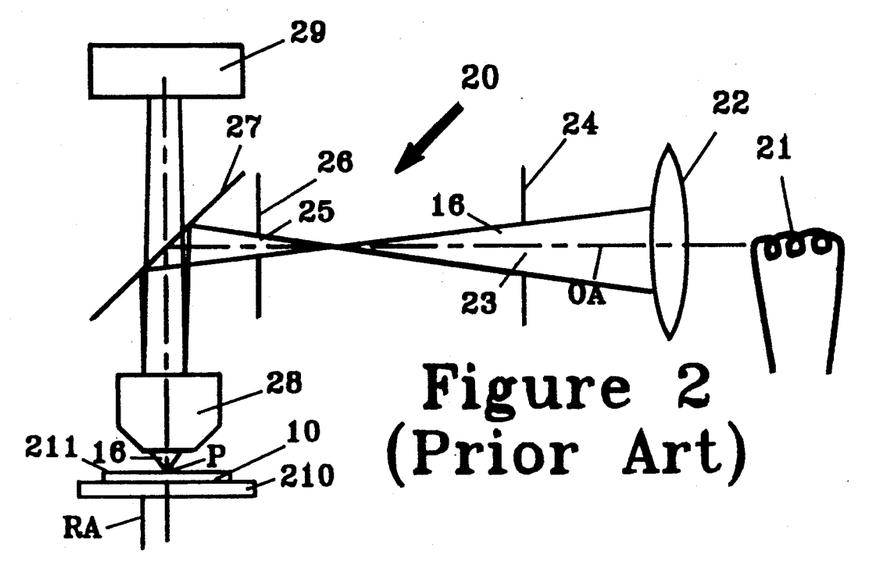
FIG. 2 is a schematic diagram of the optical section of a registration tool.

FIG. 2 is a schematic diagram of the microscope 20 utilized in a registration tool. Light from a light source 21 is collected by a condensing lens 22 to produce an optical beam 16 that is directed through a first aperture 23 in a first opaque aperture plate 24. This light beam then passes through a second aperture 25 (the "field stop") in a second opaque aperture plate 26 to a beam splitter 27 that directs a portion of this beam through an objective lens 28 onto a test wafer 10. Objective 28 directs light from this test wafer through the beam splitter to a photodetector 29.

Figure 3:
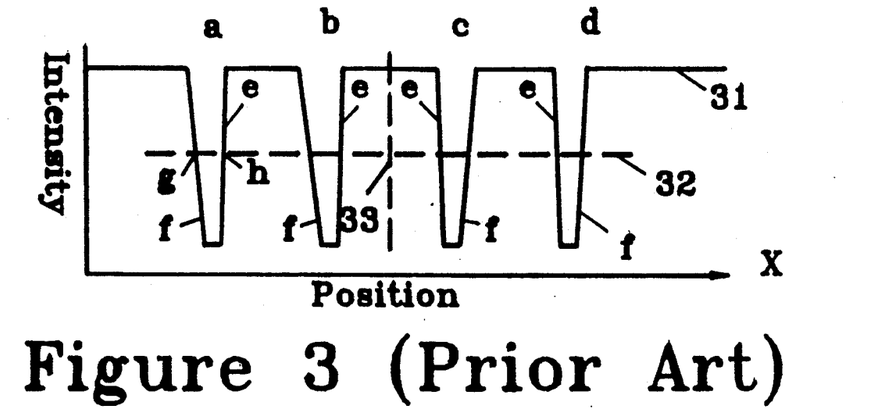
FIG. 3 illustrates a typical intensity profile as a function of displacement along a path that scans across a pair of alignment marks that are aligned vertically over one another.

The wafer pattern illustrated in FIGS. 1A and 1B is positioned in the center of the objective's field of view and is illuminated, producing an image as shown in FIG. 1B. This image is projected to a photodetector 29, such as a solid state camera, that produces a video grey scale for each line (such as line X in FIG. 1B) scanned. The intensity profile produced by this scan is a function of position along line X. Many horizontal scans parallel to line X are performed in the region between lines X and Y to produce an average intensity profile as illustrated in FIG. 3. For measurement purposes, a threshold value is selected that gives an accurate measurement of the actual feature, based on the intensity profile. The threshold value of 32% of saturation has been chosen for the example in FIG. 3. Since each pixel has a digitized intensity value associated with it, the actual intensity curve 31 is not smooth, but instead is actually a series of small steps. An interpolation algorithm is used that fits a curve through the plural points measured in each transition e and f, thereby providing sub-pixel resolution of the intersection points g and h.

The second aperture 25 in FIG. 2 functions as a field stop that produces a beam that just fills the field of view of the combination of optical elements 28 and 29. The first aperture 23 controls a tradeoff between resolution and contrast. A small aperture provides greater coherence of beam 16 by producing a smaller variation in pathlength of light in beam 16, but a small aperture also produces less beam intensity thereby degrading resolution of the photodetector. At this time, for registration testing of wafer patterns produced by a stepper having a maximum acceptable registration error of 150 nanometers or less, the registration tool must measure registration to an accuracy and resolution of approximately 10 nanometers. To achieve this accuracy of registration measurement using optical wavelengths of light in beam 16, this tradeoff becomes important for registration when device design geometries are approximately one-half micron. Therefore, in previous systems, to enable variation of this resolution/contrast tradeoff to achieve the required registration measurement resolution, the first aperture 23 is typically an iris diaphragm.

Unfortunately, the aperture of an iris diaphragm is sufficiently variable in size and location that this variability can seriously degrade measurement accuracy and resolution. The mechanical variability in the size and shape of the aperture of the iris diaphragm produces variability in both the area of the aperture and in the location of the center of this aperture. Electronic feedback from the photodetector to this aperture can produce reasonable control over the area of the aperture, but the position of the center of the aperture of an iris diaphragm is still sufficiently variable that this variation seriously degrades measurement accuracy and resolution.

SUMMARY OF THE INVENTION

The cause of this degradation of accuracy and resolution can be understood by reference to FIGS. 1A, 2, 4, 5, 6A and 6B. When aperture 23 is correctly positioned in beam 13, beam 16 is incident on test wafer 29 along a direction substantially perpendicular to the top surface of this wafer. If instead of being perpendicular to the top surface, beam 16 is incident along the nonperpendicular direction indicated in FIG. 1A by arrows 16', this will produce an asymmetric illumination of the alignment marks 11 and 14 that will produce a systematic error in the registration measurements.

Figure 4:
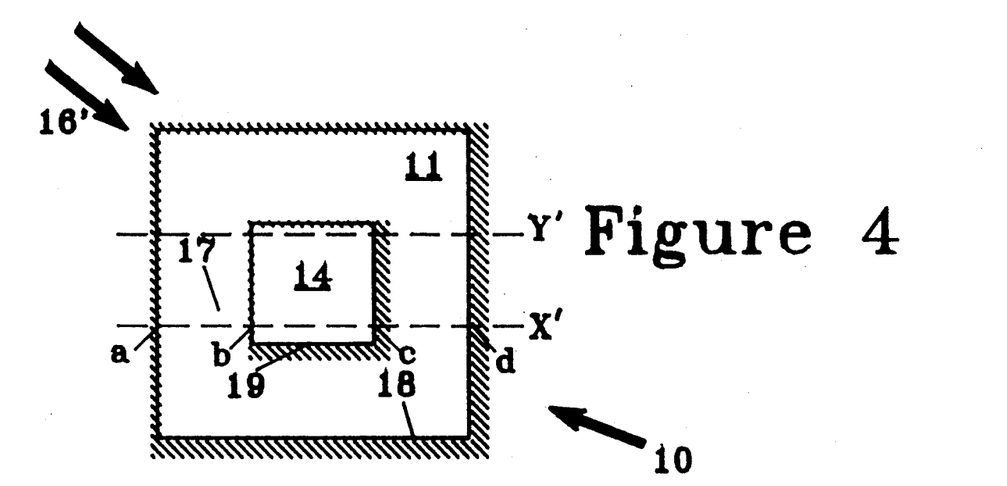
FIG. 4 illustrates the shadowing of the alignment marks of FIGS. 1A and 1B when these marks are illuminated by a beam that is directed onto the alignment marks at a slight angle away from a normal to their top major planar surfaces.
Figure 5:
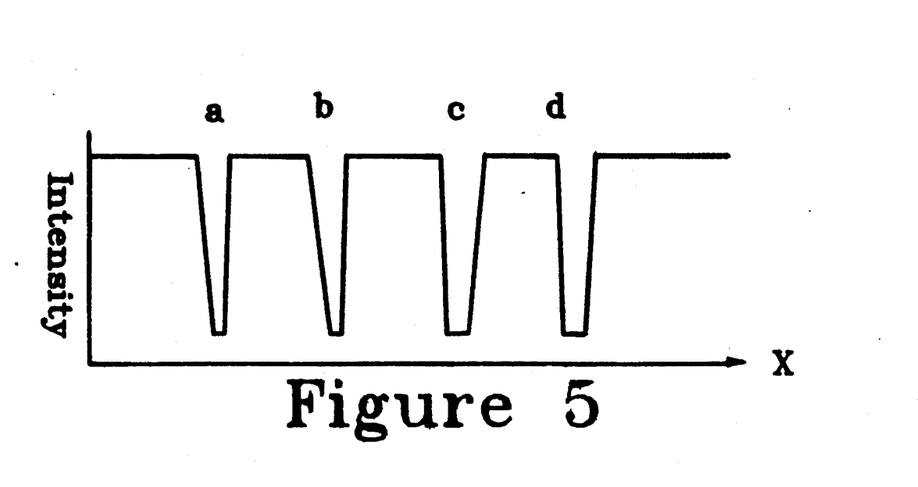
FIG. 5, when compared with FIG. 3, illustrates the shift in absorption peaks that occurs when the direction of the incident light beam is shifted slightly away from a normal to a top major surface of the alignment marks.

The origin of this error can be understood by comparison of FIG. 1B and 3 with FIGS. 4 and 5, respectively. As can be seen in FIG. 1B, shadow 18 is symmetrical and centered on alignment mark 11 and shadow 19 is symmetrical left to right and top to bottom and is centered on alignment mark 14. This results in the absorption peak a in FIG. 3 being a mirror image of absorption peak d across a mirror image line 33 midway between them and also results in absorption peak b being a mirror image of absorption peak c across a mirror image line (not shown) that is midway between the edges at c and d and that is parallel to line 33. When alignment mark 14 is centered along the x-direction over alignment mark 11, these two mirror image lines coincide.

If aperture 23 is slightly off axis such that the light beam 16 is incident on test wafer 10 at a slight angle to the normal to this wafer's top major surface 211 as indicated by arrows 16' in FIGS. 1A and 4, the mirror image symmetry of the shadows in FIG. 1B and the absorption peaks in FIG. 3 will be disturbed. As illustrated in FIGS. 4 and 5, the shadows at the top and left edges of alignment marks 11 and 14 will become smaller than in FIG. 1B and the shadows at the bottom and right edges of these alignment marks will become larger than in FIG. 1B. Thus, absorption peaks a and b in FIG. 5 are narrower than absorption peaks a and b in FIG. 3 and absorption peaks c and d in FIG. 5 are wider than absorption peaks c and d in FIG. 3. The narrowing of peaks a and b occurs primarily at their left edges and the broadening of peaks c and d occurs primarily at their right edges. Therefore, the off normal direction 16' alters the location of the edges of these absorption peaks such that both of these marks appears to be at a phantom location to the right of their actual location. Because the amount of change to the left and right edges of these absorption peaks are not generally equal and depend on the thicknesses $T_1$ and $T_2$ and edge profiles of marks 11 and 14, these shifts are considered a systematic error of the optical system and will disrupt the measurement accuracy.

In accordance with the illustrate preferred embodiment, a new type of variable aperture is provided for use on a measurement tool. This variable aperture device includes a base that is rigidly attached to optical elements 21, 22 and 26–29 of FIG. 2, a multiaperture assembly containing a plurality of accurately positioned apertures of accurately controlled circular areas, and an apparatus for motion of the multiaperture assembly relative to the base to selectively move a desired aperture 23 into the path of beam 16. In the preferred embodiment, this motion is linear but in alternate embodiments, it can be circular or some other shape that enables successive apertures to be positioned accurately in the path of beam 16. A mechanism, such as a detent mechanism, accurately controls the position of the selected aperture that is positioned into the path of beam 16, thereby providing reproducible positioning of each of these apertures.

The apertures are accurately positioned within the multiaperture assembly so that the detent mechanism will accurately align in beam 16 whichever aperture is approximately positioned into the path of beam 16. Although these apertures could be formed as an integral part of the multiaperture assembly, it is advantageous instead for the multiaperture assembly to include an aperture mounting plate, a plurality of opaque aperture plates in each of which is a circular aperture, and an aperture plate positioning mechanism to adjust the position of each aperture plate relative to the aperture mounting plate, thereby enabling each of these apertures to be positioned such that, when that aperture plate is moved into the path of beam 16, the center of its aperture is located at a fixed point of beam 16. When such positioning has occurred, the measured position will not shift when the choice of aperture in the beam path is changed. One inexpensive choice of this aperture plate positioning mechanism includes a spring to bias an opaque aperture plate against a pair of screws that can adjust the location of this aperture plate within a plane of translation of the aperture mounting plate.

This fixed point is preferably on the optical axis of this optical beam so that, not only is the measured position not affected by switching which aperture is in the beam path, there will be no spurious lateral shift between the measured position of these alignment marks and their actual position. For this choice, these apertures can be freely switched into the beam to vary resolution without negatively impacting accuracy.

Figures 6A, 6B:
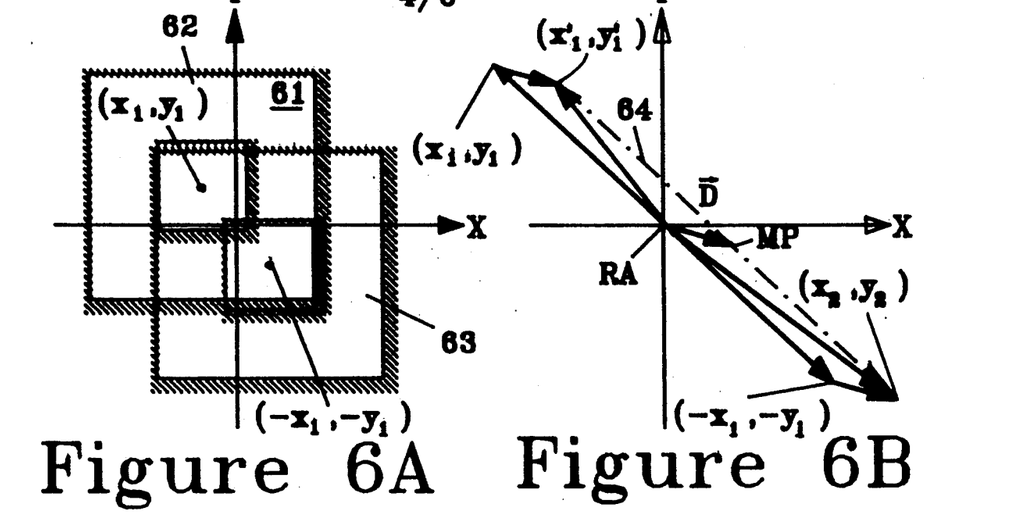
FIGS. 6A and 6B help illustrate a method of detecting a misalignment of an aperture with the center of the optical beam path.

The amount and direction of misalignment of the aperture with the center of the optical beam is measured by placing a test wafer on a rotatable platform, measuring the location of at least one alignment mark, rotating this test wafer 180° about an axis parallel to the beam at the location of the test wafer and then again measuring the location of these same alignment mark(s) when the vectors are plotted. If the aperture is center on this beam, then a straight line through these data points will pass through the origin as shown in FIG. 6B. If this does not occur, then the direction of displacement of the midpoint of this line from the optical axis indicates the displacement of this aperture relative to the aperture mounting plate needed to center this aperture on the optical axis of the optical beam.

DESCRIPTION OF THE PREFERRED EMBODIMENT

FIGS. 7A, 7B and 8A-8C illustrate an apparatus that accurately centers any selected one of a plurality of apertures onto an optical axis OA of an optical beam. This apparatus includes an aperture mounting plate that has a structure that enables it to be repeatedly, accurately aligned at each of a plurality of positions with an optical beam. The structure of the aperture mounting plate also enables each aperture to be accurately positioned relative to this aperture mounting plate. This combination enables each of these apertures to be repeatably centered onto the optical beam.

Figure 7A:
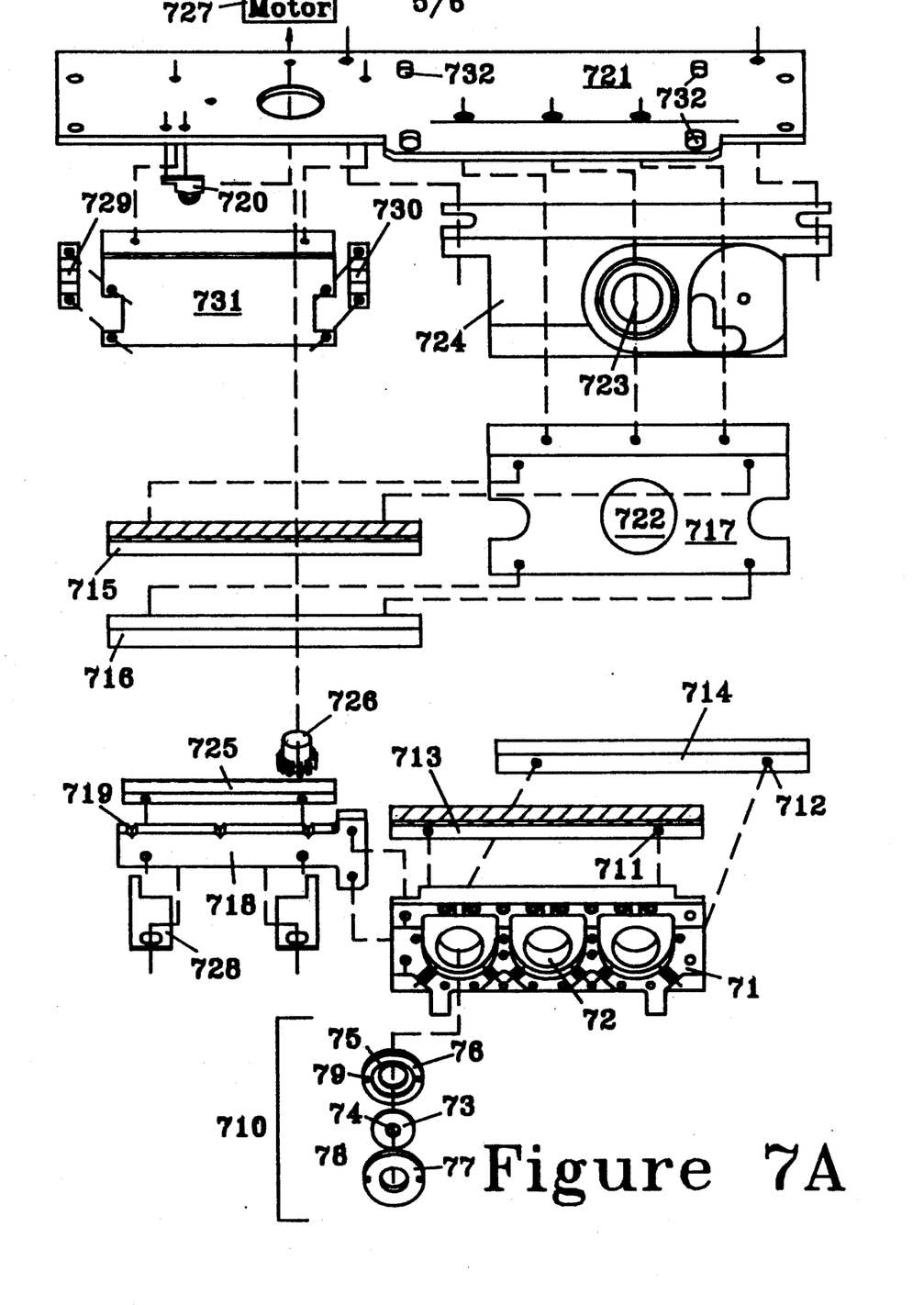
FIG. 7A is a perspective, exploded view of the aperture mounting plate and apertures and mechanism for translating the aperture mounting plate.
Figure 8A:
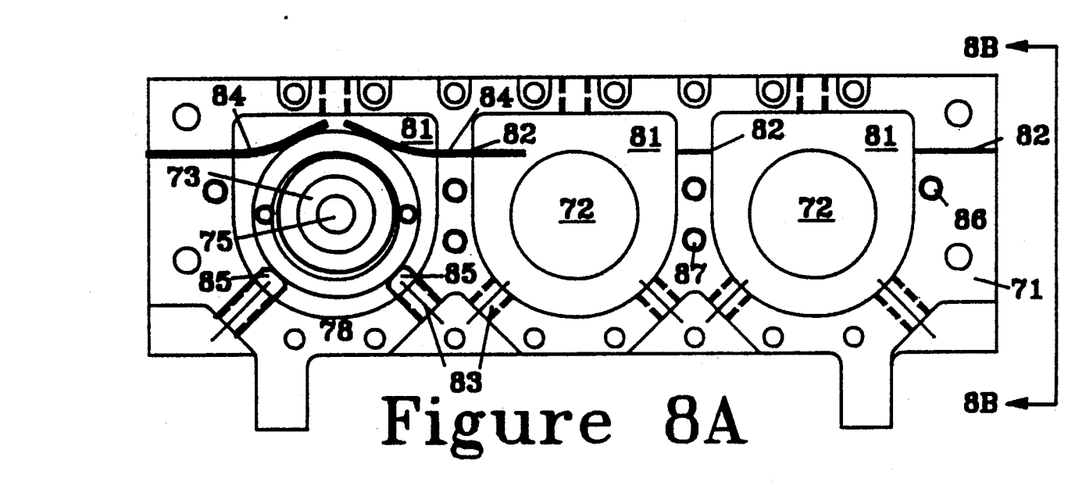
FIGS. 8A, 8B and 8C are front plan view, side plan view and back plan view, respectively of the aperture mounting plate, illustrating a mechanism utilized to align an aperture accurately within the aperture mounting plate.
Figure 8B:
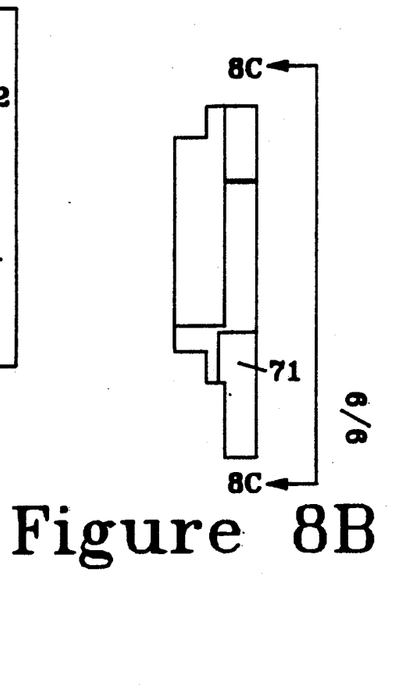
Figure 8C:
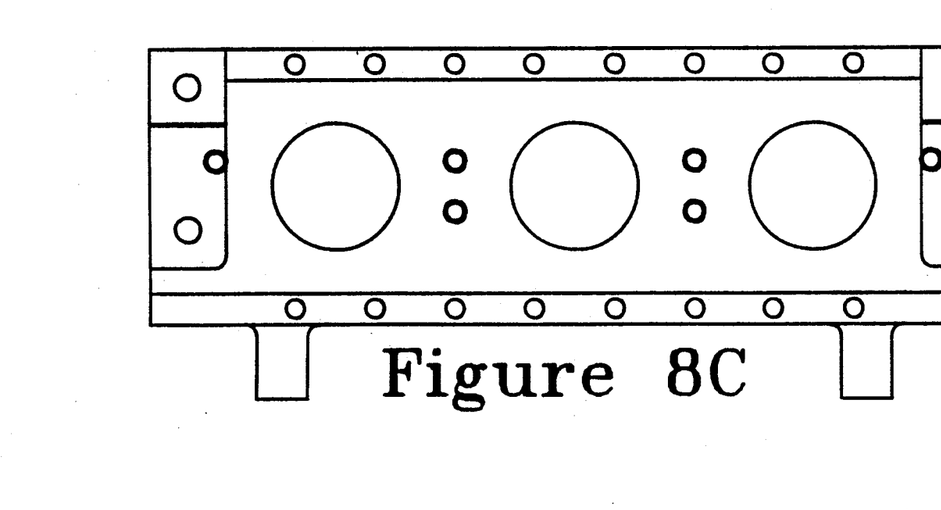

This particular embodiment, designed for use in a registration tool, includes an aperture mounting plate 71 having a set of three holes 72 in each of which is accurately positioned an opaque aperture plate 73 containing an aperture 74. Each aperture plate 73 has a circular cross-section of 1 cm diameter, a thickness of approximately 0.025 cm or less and an aperture 74 of diameter selected from the set of diameters over a range that includes the calculated value of the objective back aperture. Typical nominal diameters for the three apertures are 80, 120 and 200 mil, respectively. This provides the ability to match illumination coherence on objectives possessing different numerical aperture values. The largest diameter aperture is typically utilized during a scanning step to locate an alignment mark and the middle or smallest aperture is then utilized during the measurement process. The choice between these smaller two of the apertures is largely dependent on the depth of focus required by the particular alignment mark for which its position is being measured.

Each aperture plate is inserted into a cylindrical recess 75 in an associated aperture plate holder 76 and then is clamped into this recess by a clamping plate 77 having a pair of holes 78 through which screws are threaded into threaded holes 79. The combination of elements 73, 76 and 77 will be referred to herein as the "aperture assembly" 710.

An advantage of the aperture assembly 710 is that it allows the aperture plate 73 to be as thin as is needed to produce a good aperture 74 and also provides a wide enough edge surface 76E that aperture assembly 710 is stably engaged by springs 84 and screws 85. The aperture diameter can be easily changed by replacing aperture plate 73 with a different aperture plate 73 having the desired new aperture diameter. In alternate embodiments, the aperture assembly 710 can be formed as a single unitary part.

As illustrated in greater detail in enlarged plan view 8A, aperture mounting plate 71 contains 3 recesses 81, four spring retainer slots 82 and six screw holes 83. A leaf spring 84 is inserted into each of the spring retainer slots such that an end of each of a pair of such leaf springs extends into each recess 81. When an aperture assembly 711 is inserted into a recess 81, the springs 84 press against the perimeter of this aperture assembly and bias an opposite side of this perimeter against the ends of a pair of screws 85 that enable adjustment of the position of aperture 74 relative to the aperture mounting plate. Screws 85 are preferably 4-40 or 4-80 screws so that the thread pitch is small enough that the desired accuracy of alignment is easily achieved. Other fine motion devices could be used by those skilled in the art.

FIGS. 6A and 6B illustrate a method of measuring the amount of misalignment of the center of an aperture from the optical axis of the registration tool. As illustrated in FIG. 2, the optical axis OA of microscope 20 intersects test wafer 10 at a point P that is near a rotation axis RA about which the test wafer can be rotated. To test for alignment of the center of aperture 23 with optical axis OA, the aperture mounting plate is translated to position the desired aperture into the path of the optical beam 16 and a test wafer having an alignment mark 61 is mounted on a rotatable platform 210 that is rotatable about rotation axis RA.

FIG. 6A is a top view of this platform showing the alignment mark in its initial position 62 and in the rotated position 63 resulting from a 180° rotation about rotation axis RA. The location $(x_1, y_1)$ of the center of this alignment mark is measured and plotted in FIG. 6B. The alignment mark is substantially centered in the field of view of the microscope so that location $(x_1, y_1)$ is located substantially at the origin of each of FIGS. 6A and 6B. When beam 16 is not perpendicular to the top major surface 211 of test wafer 10, the measured location of the center of the alignment mark is at a point $(x'_1, y'_1)$ displaced by a small amount $\bar{D}$ from point $(x_1, y_1)$.

Rotatable platform 210 is now rotated by 180° about rotation axis RA so that the center of the alignment mark 61 is at point $(-x_1, -y_1)$. Because of the tilt of the optical beam 16 away from the normal to the test wafers top major surface, the measured location is at a point $(x_2,y_2)$ that is displaced from point $(-x_1,-y_1)$ by the same displacement $\bar{D}$. Similarly, the midpoint MP of a straight line 64 between points $(x'_1,y'_1)$ and $(x_2,y_2)$ is displaced from the origin by the same displacement $\bar{D}$. From this measured displacement, the position of the aperture plate can be adjusted to center the aperture onto the optical axis. This step can be iterated until a sufficient level of accuracy in positioning this aperture is achieved. This procedure is repeated for each of the apertures mounted onto the aperture mounting plate 71.

Figure 7B:
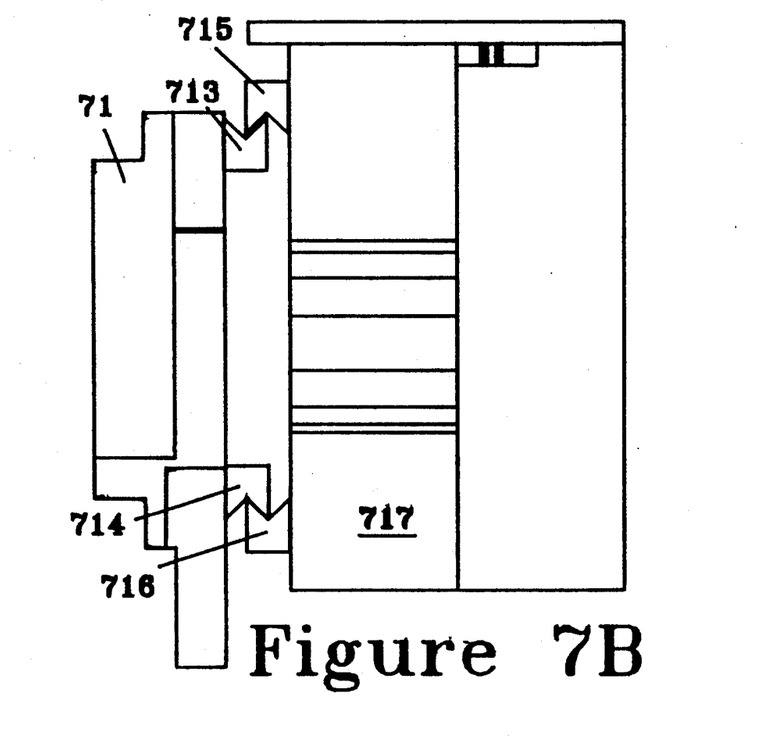
FIG. 7B is a side view of the aperture mounting plate and apertures and mechanism for translating the aperture mounting plate, illustrating a set of rails that enable lateral translation of this aperture mounting plate to selectively center one of the apertures in the path of an optical beam.

Four screws inserted through holes 711 and 712 attach a top rail 713 and a bottom rail 714 to the back side of the aperture mounting plate. Similarly, a top rail 715 and a bottom rail 716 are attached by four screws to a mounting block 717. FIG. 7B illustrates how these rails mate to enable the aperture mounting plate 71 to slide laterally relative to mounting block 717, thereby enabling each of three different apertures 74 to be translated into the optical path 16.

A notched plate 718 is attached by screws to a left end of the aperture mounting plate. On a top surface of plate 718 are three notches, each associated with one of the three holes 72 in the aperture mounting plate. A detent roller 720, mounted onto a top plate 721, presses against the top surface of notched plate 718 so that this roller will engage these notches to produce three repeatably accurate translational positions of the aperture mounting plate. Notches 719 are located so that when one of these notches is engaged by the detent, its associated hole 72 is accurately aligned collinearly with a hole 722 through mounting block 717 and with a hole 723 through an adjustable aperture block 724 that functions as a field stop 25 for microscope 20. Mounting block 717 and aperture block 724 are also attached to top plate 721.

A rack 725, attached to the back of notched plate 719, engages a gear 726 that is controllably rotated by a motor 727 to translate aperture mounting plate 71 parallel to rails 713-716. Also included in this aperture are a flag 728, a pair of sensors 729 and 730 and a sensor mount 731 that cooperate to cut power to motor 727 just in time to let a moving aperture mounting plate 71 coast to a position at which detent roller 720 engages one of notches 719. Sensors 729 and 730 are attached as indicated to sensor mount 731 which in turn is attached to top plate 721. Flag 728 is attached to a bottom side of notched plate 718. Sensors 729 and 730 are spaced apart by approximately the spacing between the notches and are positioned so that the flag passes through one of these sensors when the detent roller is approximately half way between two adjacent notches. This enables the aperture mounting plate to coast in either translational direction a distance that enables the detect roller to engage the next notch so that the aperture mounting plate gets accurately positioned relative to mounting block 717.

A set of four holes 732 in the top plate enable this apparatus to be attached to the remaining components 21, 22 and 27-29 of microscope 20. Apertures 74, aperture plate 73, aperture 723 and adjustable aperture block 724 then function as aperture 23, aperture plate 24, aperture 25 and aperture plate 26 of microscope 20.

Devices, such as the combination of elements 71-79, that provide a plurality of apertures that can be moved to selectively position one of these apertures into an optical beam path will be referred to herein as the "multiaperture assembly". Devices, such as the combination of elements 711-718 and 725-726, that provide the ability to move the multiaperture assembly as needed to selectively position one of these apertures into the optical beam path will be referred to herein as the "translation mechanism". In this embodiment, this translation is linear. In another embodiment, the apertures in the multiaperture assembly are arranged in a circular pattern so that the translation mechanism acts to rotate the multiaperture assembly to selectively position one of these apertures into the optical beam path. Devices, such as the combination of elements 718-720, that produce a plurality of stable positions into which the multiaperture assembly can be translated, will be referred to herein as a "detent mechanism". Devices, such as the combination of elements 728-731, that enable the translational position of the multiaperture assembly to be detected will be referred to herein as a "sensor assembly".

The aperture in an aperture plate 73 is formed by drilling. In other embodiments requiring a higher accuracy of placement of the aperture, a greater degree of circularity of the aperture and/or a greater accuracy of the diameter of the aperture can be achieved by photolithographic processing. An optically clear substrate is coated by an opaque material (e.g., chrome on glass) and then is covered by a photoresist. This resist is exposed through a mask having an array of open circles, the resist is developed and the opaque layer is removed in the circular regions that have been formed through the photoresist layer. The photoresist layer is then stripped and the substrate is cut to form a plurality of aperture plates 73, each containing a circular aperture of very accurate shape and diameter. Each die will typically be rectangular and can either be inserted directly into one of recesses 81 or can first be mounted in a cylindrical shell before being inserted into a recess 81.

The optical elements (e.g. elements 22 and 28) of microscope 20 exhibit a focal length that is known only within the manufacturer's tolerance which can be on the order of 5%. Such small variations in the focal lengths of these optical elements have a non-negligible effect on the accuracy of measurements made by the registration tool. Therefore, it is advantageous to be able to correct for such variations. Small changes (on the order of a percent of a few percent) in the diameters of the apertures 74 in the aperture plates 73 can provide such compensation. Therefore, for each of the nominal aperture diameters (80, 120 and 200 mils), a set of aperture plates are produced that differ in aperture diameter by known, small amounts on the order of one percent. That aperture diameter is selected that produces a closest approximation to the performance of a reference registration tool.

This ability to match automated systems through precision centering and coherence selection via the aperture provides the ability to correct for small system-to-system variations such as variations in system magnification (resulting from the tolerance range of the focal length of the optical elements). A small change in magnification will alter slightly the separation between points g and h in FIG. 3, thereby producing a spurious shift in the observed location of the edges of the features being scanned. Therefore, the ability to select that aperture diameter that best corrects for variations in the other optical elements reduces the system-to-system measurement variations.

We claim:
1. An integrated circuit fabrication tool comprising:

a light source;

a wafer support stage;

a condensing element that forms light from said light source into an optical beam that is directed to a portion of said support stage at which a wafer is to be mounted;

a multiaperture assembly having a set of apertures $A_1, \ldots A_n$, where n is an integer greater than 1;

means for moving this multiaperture assembly relative to a path along which said beam is to pass, to position this multiaperture assembly accurately in any selected position $P_k$ (for $k = 1, \ldots n$) relative to said path such that aperture $A_k$ is accurately positioned in said path; and means for collecting and measuring light from said wafer.

2. An integrated circuit fabrication tool as in claim 1 wherein said means for moving comprises:

mounting means for attaching the multiaperture assembly to a source of said beam such that the multiaperture assembly can be moved relative to the path in a manner that enables each of its apertures to be moved into said path; and a detente mechanism between the multiaperture assembly and the mounting means for reproducibly positioning the multiaperture assembly in any selected one of said positions $P_k$.

3. An integrated circuit fabrication tool as in claim 2 wherein said means for moving further comprises:

a motor coupled between the mounting means and the multiaperture assembly for moving the multiaperture assembly relative to said optical beam.

4. An integrated circuit fabrication tool as in claim 3 further comprising:

sensing means for sensing the occurrence of each of a set of relative positions $Q_k$ (for $k = 1, \ldots, p$ for some integer $q > 0$) between the multiaperture assembly and the beam;

means, responsive to said sensing means, for turning off power to said motor when one of these relative positions $Q_k$ is detected by said sensing means;

the position $Q_k$ being such that, when power to the motor is turned off by said means for turning off power, the multiaperture assembly will coast to a relative position within a capture range of the detente mechanism such that the detente mechanism establishes one of the relative positions $P_k$.

5. An integrated circuit fabrication tool as in claim 4 wherein said sensing means comprises:

a sensor;

a flag;

said sensor being attached to a first element of the set consisting of the multiaperture assembly and the means for moving;

said flag being attached to a second element of the set consisting of the multiaperture assembly and the means for moving;

these points of attachment being such that, for each relative position $Q_k$, at least one of the flags will be sufficiently proximate to a sensor that this sensor will produce an output signal indicating that relative position $Q_k$ has occurred; and said means for turning off power being responsive to this output signal to turn off power to the motor.

6. A variable aperture apparatus as in claim 1 wherein said aperture mounting plate further comprises:

a multiaperture assembly having a set of apertures $A_1 \ldots A_n$, where n is an integer greater than 1; and means for moving this multiaperture assembly relative to a path along which a beam is to pass, to position this multiaperture assembly accurately in any selected position $P_k$ (for $k = 1, \ldots n$) relative to said path such that aperture $A_k$ is accurately positioned in said path;

an aperture mounting plate;

a plurality of opaque aperture plates $AP_1 \ldots AP_n$, each of which is attached to said aperture mounting plate at a location $L_k$ of said aperture mounting plate;

said plate $AP_k$ has formed therein said aperture $A_k$ of diameter $D_k$; and an aperture plate positioning mechanism for adjusting the location $L_k$ to adjust alignment of aperture $A_k$ with said path along which a beam is to pass, whereby adjustment of the location $L_k$ enables centering of $A_k$ on this path when the multiaperture apparatus is in position $P_k$.

7. A variable aperture apparatus as in claim 6 wherein said aperture plate positioning mechanism comprises, for each of aperture plates $AP_k$;

an associated pair of lateral translation mechanisms; and an associated bias mechanism that presses this aperture plate against its pair of lateral translation mechanisms such that these two lateral translation mechanisms can adjust $L_k$ in a two dimensional plane relative to the aperture mounting plate such that aperture $A_k$ can be centered on the path of the beam when the multiaperture assembly is in position $P_k$.

8. A variable aperture apparatus as in claim 7 wherein, for $k = 1, \ldots n$, each of said lateral translation mechanisms for aperture plate $AP_k$ is a screw that is threaded into a hole in the aperture mounting plate such that an end of this screw presses against a side edge of the aperture plate $AP_k$.

9. A variable aperture apparatus as in claim 8 further comprising, for each aperture plate $AP_k$;

an aperture plate holder having a recess into which this aperture plate can be inserted; and a clamping plate that can be attached to the aperture plate holder to clamp this aperture plate into the aperture plate holder, said aperture plate holder and clamping plate producing a side edge that is thicker than the thickness of an aperture plate, this side edge of the aperture plate holder and clamping plate being in contact with the lateral translation mechanisms and the bias mechanism for that aperture plate, thereby enabling the aperture plate $AP_k$ to have a thickness that is small enough to be advantageous in producing aperture $A_k$ while providing a wide enough side edge of the clamping plate and aperture plate holder for stable positioning by the bias mechanism and lateral translation mechanism for aperture plate $AP_k$.

10. A variable aperture optical apparatus comprising:

a source of an optical beam;

a multiaperture assembly having a set of apertures $A_1 \ldots A_n$, where n is an integer greater than 1;

means for moving this multiaperture assembly relative to said optical beam, to position this multiaperture assembly accurately in any selected position $P_k$ (for $k = 1, \ldots n$) relative to said beam such that aperture $A_k$ is accurately positioned in said beam;

wherein each diameter $D_k$ is selected to substantially minimize a system-to-system performance variation that results from variation of system optics due to manufacturing tolerances.

* * * * *